Patented July 31, 1945

2,380,546

UNITED STATES PATENT OFFICE 2,380,546

ANTIOXIDANTS

Wilbur I. Patterson and Martin B. Williamson, Chagrin Falls, Ohio, assignors to S. M. A. Corporation, Chicago, Ill., a corporation of New Jersey No Drawing. Application August 21, 1943, Serial No. 499,572

5 Claims. (Cl. 252—398)

This invention relates to antioxidants and a method of preparing the same.

The increased use of materials especially fats in medicine and food which are subject to oxidation has made necessary the incorporation therein of some compound capable of inhibiting oxidation.

We have discovered an active antioxidant which may be extracted from rice bran concentrate and possessing increased potency thus insuring maximum antioxidant activity.

Rice bran concentrate, which may be purchased commercially is usually an aqueous extraction or an aqueous alcoholic extraction and this invention in its broadest sense comprises an antioxidant extracted from either extraction, highly purified, of increased potency and value.

While we believe that the bran concentrate of some cereal products other than rice may be used, the illustrative example which follows contemplates the use of rice bran concentrate.

Using as starting material either an aqueous extraction of rice bran concentrate or an aqueous alcoholic extraction thereof, 250 pounds of the concentrate are stirred vigorously with 250 pounds of chloroform until an intimate mixture is assured. Other halogenated hydrocarbon solvents having a boiling point below 100° C. such as ethylene dichloride may be used or ethyl ether. Mixing is done at room temperature but any temperature between the solidification point of the concentrate and the boiling point of the extracting solvent is suitable. The concentrate may be extracted direct or diluted with water before starting the process.

The mixture is allowed to stand until the chloroform separates to the bottom. The addition of up to twenty-five per cent alcohol to the mixture will facilitate the separation. The extraction may be repeated upon the same lot of concentrate until no further extraction can be had or the process performed in a continuous extractor suitable for two immiscible liquids.

The chloroform layer may be extracted directly with a solution of dilute alkali in order to get the antioxidant into an aqueous solution and the chloroform used for repeated extraction of the bran concentrate until the major portion of the chloroform soluble antioxidant has been removed. Usually three to five extractions are sufficient.

The chloroform extracts may be concentrated to a small volume before treatment with dilute alkali. The antioxidant is again transferred from the alkaline aqueous solution by extraction with an organic solvent such as chloroform or ethyl ether following adjustment of the pH of the aqueous solution to pH 5. Any pH within the range of from 3 to 6 will serve the purpose and the selection of the solvent is limited to one immiscible with water and in which the antioxidant is readily soluble.

The reextracted material thus obtained may be used for its antioxidant properties or subjected to further purification as hereinafter described.

The solvent is evaporated from the mixture in vacuo preferably in an inert atmosphere and the residue distilled in high vacuum. The active component distills at a bath temperature of 100 to 200° C. and is separated into fractions on the basis of the bath temperature at which the material distilled. Three fractions are usually obtained, the first between 90 to 110° C. and being a lemon colored oil. The second fraction is obtained between 110 and 140° C. and is a reddish brown viscous fluid, while the third is obtained at 140 to 190° C. and is darker in color than the second fraction and of approximately the same viscosity. While the second and third fractions exhibited marked potency as antioxidants by the assay method used, the first fraction, when properly separated from the second, contains negligible antioxidant activity.

Redistillation of this material in vacuo gives a light colored product. Distillation occurs at about 100 to 110° C. at from 10 to 100 microns pressure.

The fractions secured from the above process may be further purified by extraction with hot petroleum ether which dissolves a considerable portion of inactive material. The petroleum ether insoluble material is almost completely soluble in ethyl ether except for a small dark residue is soluble in methanol. The material in ether solution represents the fraction of greatest potency.

The material obtained by distillation is not a single pure compound and may comprise one or more components which are responsible for the antioxidant activity but when prepared in accordance with our process the material has very potent antioxidant properties as measured by the protection which it gives to butter yellow in admixture with corn starch and linoleic acid. In addition to the above assay method, the protection which the distillate gives to mixed fats dispersed in skim milk and dried is described in Table II.

TABLE I

*Summary of concentration of antioxidant from 250 lbs. of rice bran concentrate*

| Material | | Yield |
|---|---|---|
| Rice bran concentrate | pounds | 250 |
| Chloroform extracts (8) | grams | 280 |
| Crude distillate 90-190° | do | 38 |
| Distillate 90-110° | | 6.7 |
| Distillate 110-140° | | 11.4 |
| Distillate 140-190° | | 20.0 |
| Petroleum ether soluble | grams | 28.0 |
| Petroleum 90-110° | | 5.0 |
| Petroleum 110-140° | | 8.0 |
| Petroleum 140-190° | | 13.5 |
| Petroleum ether insoluble | grams | 14.0 |
| Petroleum 90-110° | | 2.0 |
| Petroleum 110-140° | | 5.5 |
| Petroleum 140-190° | | 6.5 |

TABLE II

*Comparative effect of rice bran distillate with rice bran concentrate in retarding rancidity of fats in dried milk powder*

| Antioxidant | Amount, mg. | Whole milk powder, gm. | Days until rancid | Special¹ D milk, gm. | Days until rancid |
|---|---|---|---|---|---|
| Rice bran concentrate | 300 | 100 | 55 | 100 | 48 |
| Distillate of extract from rice bran concentrate | 50 | 100 | 69 | 100 | 62 |
| Control | 0 | 100 | 28 | 100 | 28 |

¹ A mixture of animal and vegetable fats in dried milk powder.

A distinct forward step in the art and an advantage of the disclosed process is that the original aqueous extract of concentrate can be used after our treatment for whatever purpose said concentrate was originally intended since no vitamin content is altered by extraction of any other vitamins and a considerable proportion of the antioxidant remains in the concentrate.

The material separated is insoluble in petroleum ether, completely soluble in sodium carbonate solution and cannot be extracted therefrom by the usual fat solvents.

What we claim is:

1. The process of preparing an antioxidant from rice bran concentrate comprising extracting said concentrate with a halogenated hydrocarbon solvent having a boiling point below 100° C., extracting the resulting extract with an aqueous medium under alkaline conditions, re-extracting the thus obtained aqueous extract under acidic condition with said halogenated hydrocarbon solvent and distilling off said solvent from the resulting extract.

2. The process of preparing an antioxidant from rice bran concentrate comprising extracting said concentrate with a halogenated hydrocarbon solvent having a boiling point below 100° C., extracting the resulting extract with an aqueous medium under alkaline conditions, re-extracting the thus obtained aqueous extract under acidic condition with said halogenated hydrocarbon solvent and distilling off said halogenated hydrocarbon solvent from the resulting extract and fractionally distilling the residue to obtain a potent antioxidant fraction.

3. An antioxidant comprising an extract of rice bran concentrate soluble in a halogenated hydrocarbon solvent having a boiling point below 100° C., insoluble in petroleum ether and completely soluble in sodium carbonate solution, said antioxidant being prepared in accordance with the process set forth in claim 1.

4. An antioxidant comprising an extract of rice bran concentrate soluble in a halogenated hydrocarbon solvent having a boiling point below 100° C., insoluble in petroleum and completely soluble in sodium carbonate solution, said antioxidant being prepared in accordance with the process set forth in claim 2.

5. An antioxidant comprising a chloroform and ether soluble liquid substance distillable over a range of 110 to 190° C., and obtainable from a rice bran concentrate, said antioxidant being prepared in accordance with the process set forth in claim 2.

WILBUR I. PATTERSON.
MARTIN B. WILLIAMSON.